Aug. 26, 1924.                                              1,506,399
                        J. WILLIAMS
                         DUST CAP
                  Original Filed Dec. 31, 1921
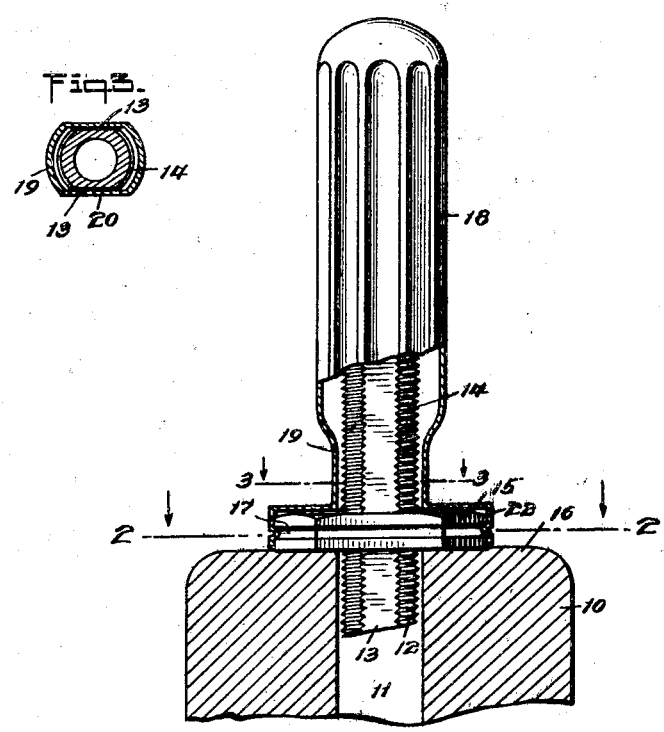
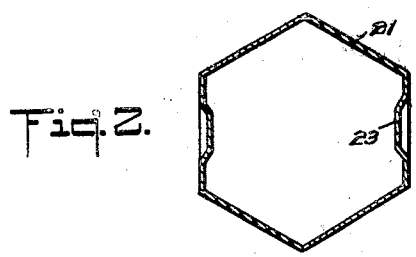
INVENTOR
Jewell Williams
BY
Warren S. Orton
ATTORNEY Patented Aug. 26, 1924.

1,506,399

UNITED STATES PATENT OFFICE.

JEWELL WILLIAMS, OF KEYPORT, NEW JERSEY, ASSIGNOR TO INGLIS M. UPPERCU, OF NEW YORK, N. Y.

DUST CAP.

Application filed December 31, 1921, Serial No. 526,351. Renewed July 15, 1924.

*To all whom it may concern:*

Be it known that I, JEWELL WILLIAMS, a citizen of the United States, and resident of Keyport, in the county of Monmouth and State of New Jersey, have invented certain new and useful Improvements in Dust Caps, of which the following is a specification.

The invention relates in general to a means for securing a sleeve such as dust cap to a threaded projection or stem, and the invention specifically relates to an improved form of valve stems and its protecting dust cap in pressure gages of the type usually found on automotive vehicle tire constructions.

It is the usual practice in pressure valve gage mountings to have the stem project through the tire rim and to secure the stem in position by means of a clamping nut threaded to the stem and bearing on the inner circumference of the tire rim. This nut is quite apt to become loosened while in use due to incidental vibration, expansion of parts and the like. This nut provides a convenient stop limiting the seating movement of the usual dust cap but where the cap engages a loose nut the security of the cap is not insured and this condition is aggravated where the cap must be screwed to the nut.

Accordingly, one of the objects of the invention is to provide a simplified arrangement of stem cap and nut organized so that the nut can be readily tightened into position engaging the tire rim and the simple act of telescoping the cap into closed position on the stem will automatically lock the cap and nut against relative rotary movement; will act to secure the cap against accidental removal, and at the same time offer but a slight resistance to any intentional manual withdrawal of the cap.

Valve stems of the type described are provided with one or more flat sides which interrupt the threads, and the invention takes advantage of this non-circular cross-section construction of the stem to prevent rotary movement between the telescoping cap and the stem. The cap then includes an extension in the form of a housing for containing and holding the nut, which is usually of non-circular form, thus preventing relative rotary movement between the nut and cap and in this way the cap acts to lock the nut against rotation.

The invention further features a snap fastening means between the cap and nut arranged so as to hold the same lightly and at the same time to resist accidental longitudinal movement of the cap off the stem.

Still another object of the invention is to provide a mounting of the cap so that centrifugal force of the carrying wheel will tend to secure the cap in its lightly held position.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is an enlarged view in elevation and with parts broken away showing a preferred embodiment of the invention installed in position on a vehicle wheel tire;

Figure 2 is a horizontal sectional view of the nut containing end of the cap and taken on the line 2—2 of Figure 1; and Figure 3 is a similar view taken on the line 3—3 of Figure 1.

In the following description and in the claims, parts will be identified by specific names for convenience of expression but they are intended to be as generic in their application to similar parts as the art will permit.

In the drawings there is shown a tire rim 10 provided with the usual valve opening 11 through which extends a valve stem 12. The stem is provided with two oppositely disposed flat sides 13 and with screw threads 14. A hexagonal nut 15 resembling conventional structure engages the threads 13 and bears upon the inner periphery 16 of the tire rim 10. As thus far described it is understood that the device is of conventional structure. The nut 15 differs from conventional forms in that the perimeter is provided entirely about the same with a half round groove 17. The projecting end of the stem exteriorly of the rim is closed by means of a dust cap 18. This cap is of conventional form, except that it is constricted at its lower portion to form a waist 19 which is provided on opposite sides thereof with flattened portions 20 designed to parallel and engage the flattened portions 13 of the stem so as to prevent rotary movement between the stem and cap. The lowermost portion of the cap is enlarged to form a hexagonal shaped housing 21 which has a configuration, as shown in Figure 2, to engage about the perimeter of the nut and thus prevent relative rotary movement between the cap and nut. The housing 21 includes an outlining depending flange 22 which is provided on opposite sides thereof as shown in Figure 2 with inwardly pressed depressions 23 designed to engage in the groove 17, as shown in Figure 1. The tongue and groove connections thus act to form snap fasteners to resist accidental movement of the cap longitudinally from the stem. It will be understood that the cap is made of some resilient metal, preferably a sheet metal stamping or drawn tube, and that the flange 22 has sufficient resiliency to permit the sides to function as part of a snap fastener. Obviously the housing 21 may be separate from the cap 18 and may engage the threads 13 and thus lock the nut.

In operation it will be understood that the nut will be screwed up into tight engagement with the rim should it become loosened, and the operator in positioning the cap will simply rotate the same until the flat sides are in opposition in which position the cap can be moved towards the closing position shown in Figure 1. A little pressure on the cap as it is moved towards its lowermost position shown in Figure 1 will cause the projections 23 to snap into opposite parts of the groove 17.

In this way the nut is locked against rotary movement and the cap is secured in its fixed position. However, access to the stem or to the gage therein is readily provided simply by jerking the cap from the position shown in Figure 1 after which it may readily be restored as suggested.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination of a threaded stem provided with a flat side, a clamping nut engaging the threads on the stem, said nut provided with an element of a snap fastener, a cap telescoping the end of the stem provided with a reduced and flattened waist portion for engaging said flat side of the stem and also provided with a nut housing having means for engaging the nut to prevent relative rotary movement between the nut and cap and also having an element of a snap fastener coacting with the corresponding element on the nut to resist accidental removal of the cap from the stem.

2. A dust cap construction for valve stems including a threaded stem, a clamping nut engaging the threads on the stem, said nut provided with an element of a snap fastener, a cap telescoping the end of the stem, means for preventing rotary movement between the cap and stem, means for preventing rotary movement between the cap and nut and said cap provided with an element of a snap fastener co-acting with the element on the nut to resist removal of the cap from the nut.

3. In a device of the class described, the combination of a threaded stem having a part thereof non-circular in cross-section, a nut having a perimeter noncircular in outline and adjustably engaging the threads on the stem and a cap telescoping said stem and nut and having a part fitted to said non-circular part of the stem to prevent relative rotary movement and having a part fitted to said nut to prevent relative rotary movement.

4. In a device of the class described, the combination of a threaded stem having a part thereof non-circular in cross-section, a nut having a perimeter noncircular in outline and adjustably engaging the threads on the stem and a cap telescoping said stem and nut and having a part fitted to said non-circular part of the stem to prevent relative rotary movement and having a part fitted to said nut to prevent relative rotary movement and means for securing the cap to the nut.

5. In a device of the class described, the combination of a threaded stem, a nut for the same adapted to be positioned at variable points along the threaded portion of the stem, means for locking the nut to the stem in any of its adjusted positions, said means being freely slidable longitudinally of the stem into operative engagement with the nut and enclosing one end of the stem.

Signed at Keyport, in the county of Monmouth and State of New Jersey, this seventeenth day of November, A. D. 1921.

JEWELL WILLIAMS.

Witnesses:
 A. M. SIEBEN,
 NELSON H. ROBERTS.